US010364325B2

(12) United States Patent
Lombardi

(10) Patent No.: US 10,364,325 B2
(45) Date of Patent: Jul. 30, 2019

(54) BORATE ESTERS

(71) Applicant: John L. Lombardi, Tucson, AZ (US)

(72) Inventor: John L. Lombardi, Tucson, AZ (US)

(*) Notice: Subject to any disclaimer, the term of this patent is extended or adjusted under 35 U.S.C. 154(b) by 155 days.

(21) Appl. No.: 15/495,683

(22) Filed: Apr. 24, 2017

(65) Prior Publication Data

US 2017/0226287 A1 Aug. 10, 2017

Related U.S. Application Data

(62) Division of application No. 14/752,553, filed on Jun. 26, 2015, now Pat. No. 9,631,052.

(60) Provisional application No. 62/017,419, filed on Jun. 26, 2014.

(51) Int. Cl.
C08G 73/02 (2006.01)
C08G 77/388 (2006.01)
C08L 79/02 (2006.01)

(52) U.S. Cl.
CPC ......... *C08G 73/0213* (2013.01); *C08G 73/02* (2013.01); *C08G 73/028* (2013.01); *C08G 77/388* (2013.01); *C08L 79/02* (2013.01)

(58) Field of Classification Search
CPC ...... C08G 73/0213; C08L 79/02; C08L 85/04
See application file for complete search history.

(56) References Cited

U.S. PATENT DOCUMENTS

| | | | |
|---|---|---|---|
| 3,726,703 A * | 4/1973 | Dornte | C03C 17/32 106/13 |
| 3,867,175 A * | 2/1975 | Dornte | C08G 73/0213 106/13 |
| 3,963,806 A * | 6/1976 | Dornte | C08G 73/0213 528/361 |
| 4,675,134 A | 6/1987 | Miura et al. | |
| 4,945,112 A | 7/1990 | Zipplies et al. | |
| 5,354,829 A * | 10/1994 | Swisher | C03C 25/26 427/387 |
| 5,728,734 A | 3/1998 | Sato | |
| 5,962,518 A | 10/1999 | Stenzel et al. | |
| 6,008,165 A * | 12/1999 | Shanklin | C10M 163/00 508/185 |

(Continued)

FOREIGN PATENT DOCUMENTS

CN 101715780 A 6/2010
EP 1064846 A1 1/2001

(Continued)

OTHER PUBLICATIONS

Machine Translation of JP 2005263879 A (Year: 2019).*

*Primary Examiner* — Michael M Dollinger
(74) *Attorney, Agent, or Firm* — Dale F. Regelman; Grossman, Tucker, Perreault & Pfleger, PLLC

(57) ABSTRACT

A method to prepare a borate complexed polyalkylguanidinium polymer, the method including heating bis(hexamethylene triamine and guanidine chloride to prepare a polyalkylguanidinium chloride, reacting the polyalkylguanidinium chloride with glycidol in an equimolar amount of glycidol and secondary amine functionalities present in the polyalkylguanidinium chloride to prepare a N-2,3-dihydroxypropyl polyalkylguanidinium chloride polymer, and reacting the N-2,3-dihydroxypropyl polyalkylguanidinium chloride polymer with a boron-oxide material to prepare the borate complexed polyalkylguanidinium polymer.

16 Claims, 1 Drawing Sheet

(56) References Cited

U.S. PATENT DOCUMENTS

| | | | | |
|---|---|---|---|---|
| 6,156,222 | A * | 12/2000 | Jennings | A62D 1/0085 252/2 |
| 6,372,789 | B1 | 4/2002 | Urihara et al. | |
| 6,673,890 | B1 * | 1/2004 | Boeckh | C08G 73/02 510/321 |
| 6,734,148 | B2 * | 5/2004 | Bell | C10M 133/56 508/192 |
| 6,894,144 | B1 * | 5/2005 | Zech | A61K 6/10 267/222 |
| 7,384,896 | B2 * | 6/2008 | George | C10M 163/00 508/291 |
| 2004/0058202 | A1 | 3/2004 | Payne et al. | |
| 2009/0032057 | A1 | 2/2009 | McCormick et al. | |
| 2009/0130052 | A1 | 5/2009 | Schmidt | |
| 2009/0182118 | A1 | 7/2009 | Nyzhnyk et al. | |
| 2010/0158853 | A1 * | 6/2010 | DeSousa | A01N 33/12 424/78.37 |
| 2011/0256227 | A1 | 10/2011 | Mirosevich et al. | |
| 2011/0269936 | A1 | 11/2011 | Tets et al. | |
| 2014/0275447 | A1 | 9/2014 | Lombardi | |

FOREIGN PATENT DOCUMENTS

| | | | |
|---|---|---|---|
| JP | 2005263879 A * | 9/2005 | |
| WO | 2013106863 A1 | 7/2013 | |

* cited by examiner

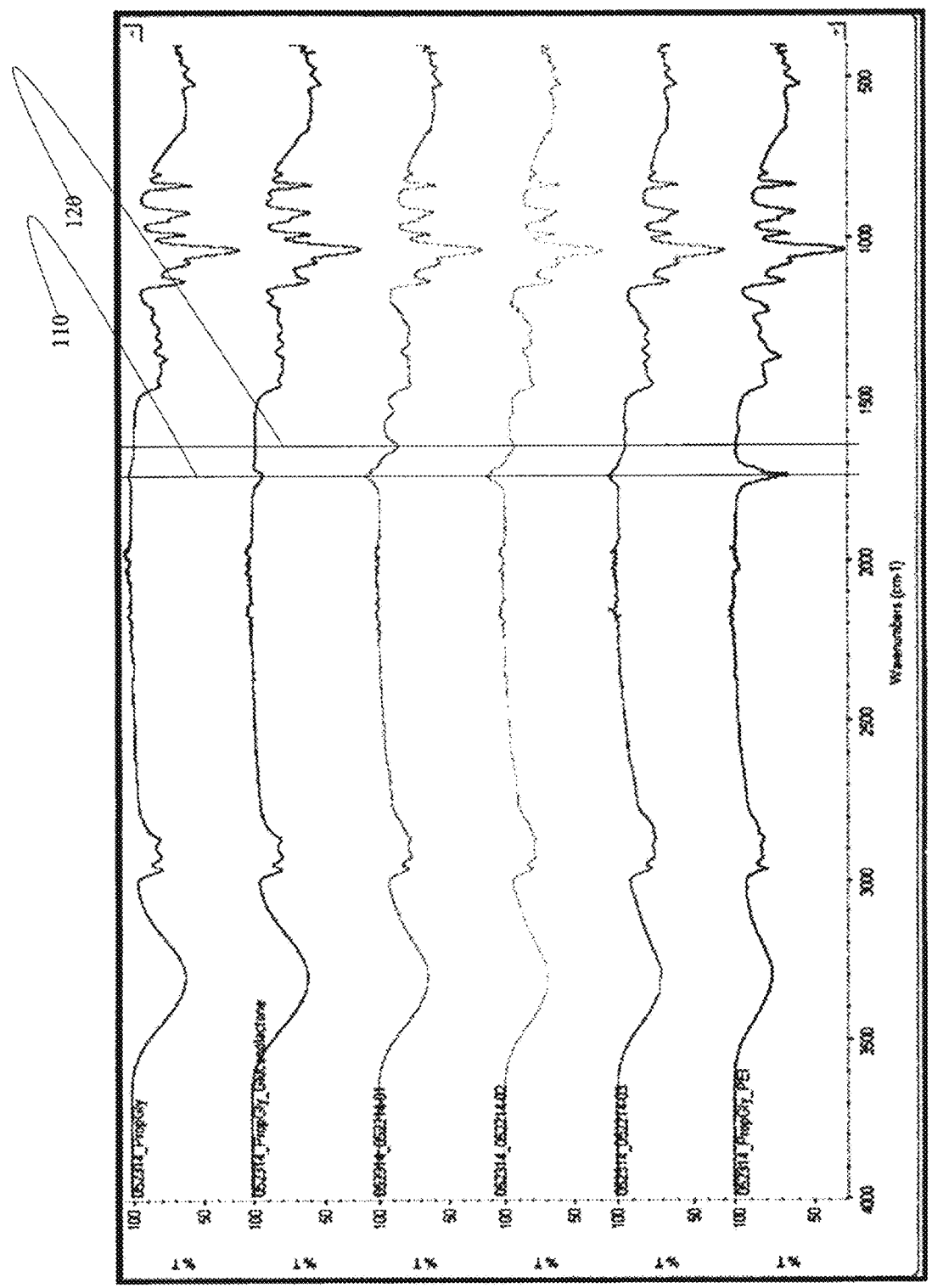

BORATE ESTERS

CROSS REFERENCE TO RELATED APPLICATIONS

This application is a Divisional of U.S. Non-Provisional Application having Ser. No. 14/752,553, filed on Jun. 26, 2015, which claimed the benefit of U.S. Provisional Application having Ser. No. 62/017,419, filed Jun. 26, 2014, the entire content of which are herein incorporated by reference.

FIELD OF THE INVENTION

A composition of matter is disclosed where that composition comprises a borate ester polymer.

BRIEF DESCRIPTION OF THE DRAWINGS

The invention will be better understood from a reading of the following detailed description taken in conjunction with the drawings in which like reference designators are used to designate like elements, and in which:

FIG. 1 recites a plurality of FTIR graphs monitoring the progress of a reaction between polyethyleneimine and glycidol.

DETAILED DESCRIPTION OF THE PREFERRED EMBODIMENTS

This invention is described in preferred embodiments in the following description with reference to the FIGURES, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The following examples are presented to further illustrate to persons skilled in the art how to make and use Applicant's borate ester compositions. These examples are not intended as a limitation, however, upon the scope of the invention.

Example 1

Preparation of Borate Ester Polymer 7

Polyalkylene guanidine hydrochloride 3 was prepared via neat melt aminolysis reaction between 13647 g bis(hexamethylene triamine) (63.47 mol 98% purity INVISTA BHMT triamine) 1 and 6053 g Guanidine Hydrochloride (63.36 mol 99% assay Alz Chem) 2 at about 160° C. accompanied by removal of ammonia condensation reaction by-product. In certain embodiments, 337.21 g Huntsman Jeffamine T-403 Alkoxylated Triamine (0.77 mol) are also added to this reaction mixture.

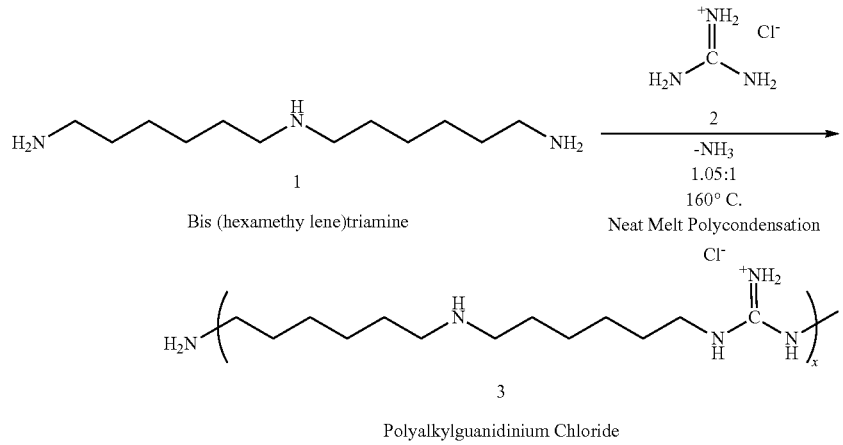

The melt was cooled, dissolved in a solvent, and then and heated to about 30° C. In certain embodiments, 4701.86 g of Glycidol 4 were then added in masse to the reactor in a 1:1 molar equivalent stoichiometric ratio (e.g. equimolar amount of glycidol to secondary amine functionalities present upon the polyalkylguanidinium chloride 3 polymer backbone) accompanied by rapid stirring to insure a completely homogeneous mixture.

In other embodiments, differing substoichiometric ratios of glycidol to secondary amine molar ratios are utilized. In various embodiments, the glycidol to secondary amine molar ratio ranges from about 0.2 to 1 to about 2 to 1.

After glycidol addition, the reactor was then heated to approximately 35° C. whereby an exothermic reaction ensued producing N-2,3-dihydroxypropyl polyakylguanidinium chloride polymer 5. Efforts were made to keep a peak exothermic reaction temperature below about 54° C.

In certain embodiments, a substoichiometeric amount of glycidol is added to polymer 3. In these embodiments, the product mixture include both polyol 5 and unreacted polyalkylguanidinium chloride 3.

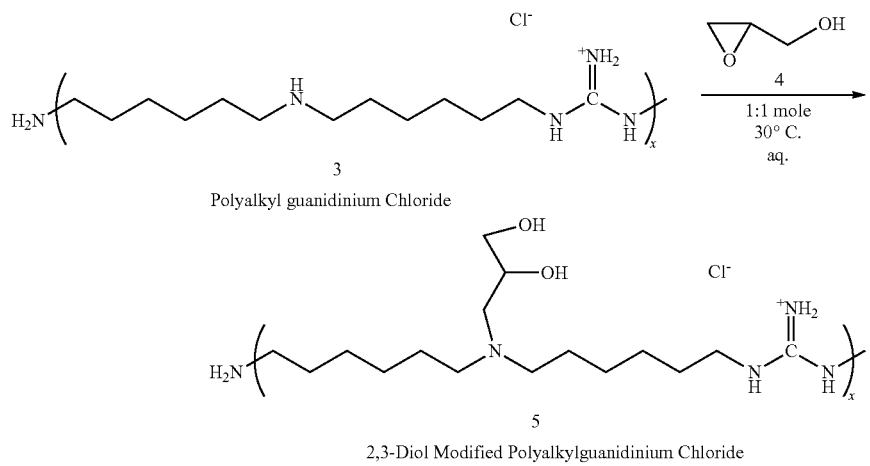

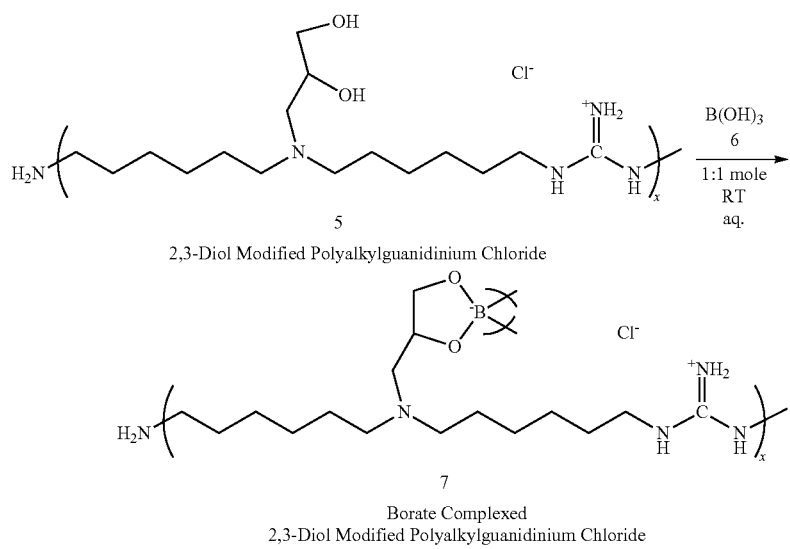

Orthoboric acid 6 was added to the reactor to form a spiroorthoborate ester crosslinked polymeric material 7.

In certain embodiments, other boron-oxides can be used in place of boric acid. For example and without limitation in certain embodiments, borax is used to prepare borate ester polymer 7 from polyol 5. As those skilled in the art will appreciate, borax is generally described as Na2B4O7.10H2O. However, it is better formulated as $Na_2[B_4O_5(OH)_4] \cdot 8H_2O$, since borax contains the $[B_4O_5(OH)_4]^{2-}$ ion. In this structure, there are two four-coordinate boron atoms (two $BO_4$ tetrahedra) and two three-coordinate boron atoms (two $BO_3$ triangles).

Borax is also easily converted to boric acid and other borates, which have many applications. Borax reaction with hydrochloric acid to form boric acid is:

$$Na_2B_4O_7 \cdot 10H_2O + 2HCl \rightarrow 4H_3BO_3 + 2NaCl + 5H_2O$$

The formation of polymeric borate ester 7 is described hereinabove in discrete steps, Applicant's entire synthetic reaction scheme to prepare polymeric borate ester 7 can be performed in "one pot," as illustrated immediately hereinbelow.

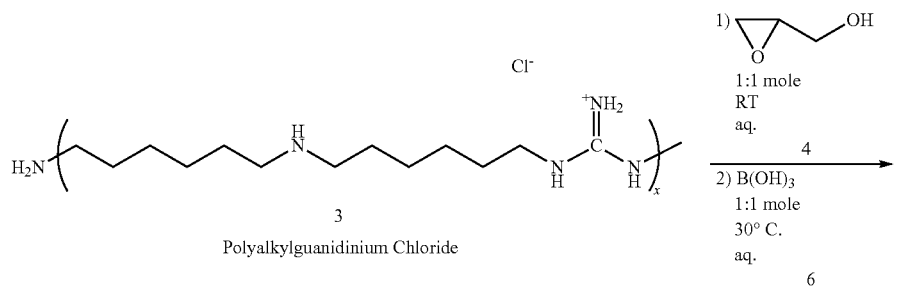

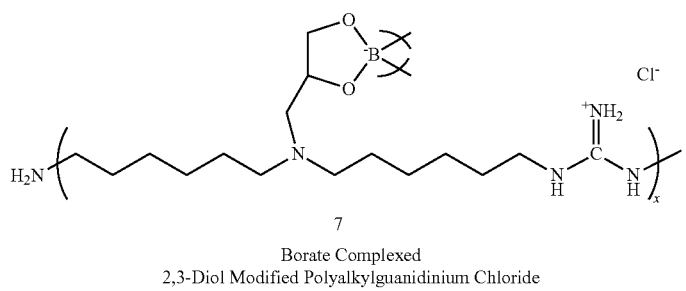

Chemical Abstracts Service has assigned CAS Registry Number 1480565-79-4 for borate ester polymer 7.

TABLE 1 recites the weight percentages of compounds 1, 2, 4, and 6, employed in one embodiment to prepare polymeric borate ester 7.

TABLE 1

| Reactant | Reactant CAS Registry Number | Concentration (Wgt. %) |
| --- | --- | --- |
| Bis(Hexamethylene)Triamine (INVISTA BHMT) | 143-23-7 | 48.2 |
| Guanidine Hydrochloride | 50-01-1 | 21.4 |
| Glycidol | 556-52-5 | 16.6 |
| Boric Acid | 10043-35-3 | 13.8 |

Example 2

Preparation of Borate Ester Polymer 10

In certain embodiments, Applicant utilizes a polyethyleneimine ("PEI") 8 as a starting material for preparation of a polymeric borate ester.

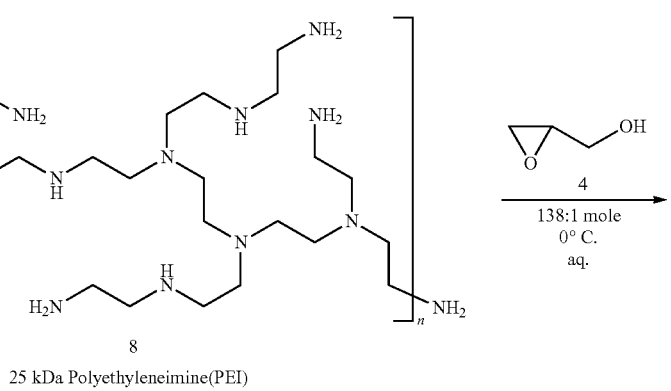

-continued

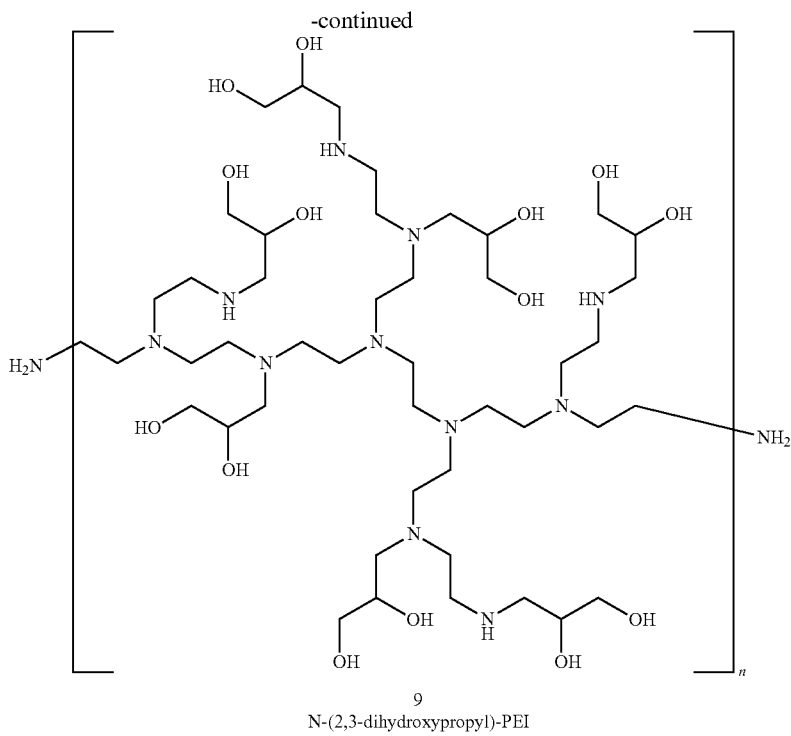

9
N-(2,3-dihydroxypropyl)-PEI

In certain embodiments, a slow addition to PEI 8 of glycidol 4 is utilized to alkylate both primary and secondary amine functional groups present. In certain embodiments, Applicant utilized PEI sold under the tradename LUPASOL WF. In certain embodiments, the starting PEI 8 has a number average molecular weight of about 25,000 Daltons. In certain embodiments PEI 8 comprises about 25 mole percent primary amino end groups, about 50 mole percent secondary amino groups in the polymeric backbone, and about 25 mole percent tertiary amino groups in the polymeric backbone.

In certain embodiments, a substoichiometeric amount of glycidol 4 is added to PEI 8. In these embodiments, the product mixture include both polyol 9 and unreacted PEI 8.

In certain embodiments, a reactor temperature was maintained at temperatures below about 40° C. during the glycidol addition to prevent its auto-acceleration.

In certain embodiments, orthoboric acid 6 is added to the PEI/glycidol adduct 9 forming spiroorthoborate crosslinked polymer 10. As those skilled in the art will appreciate, the crosslink density of borate ester polymer 10 is determined by the molar ratio of boric acid 6 to polyol 9.

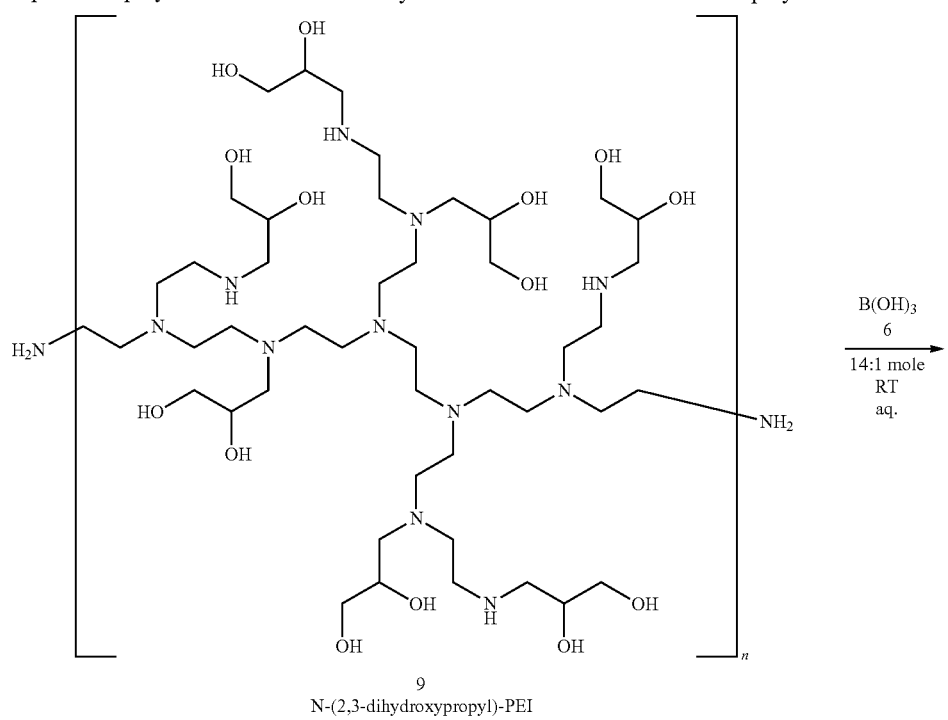

9
N-(2,3-dihydroxypropyl)-PEI

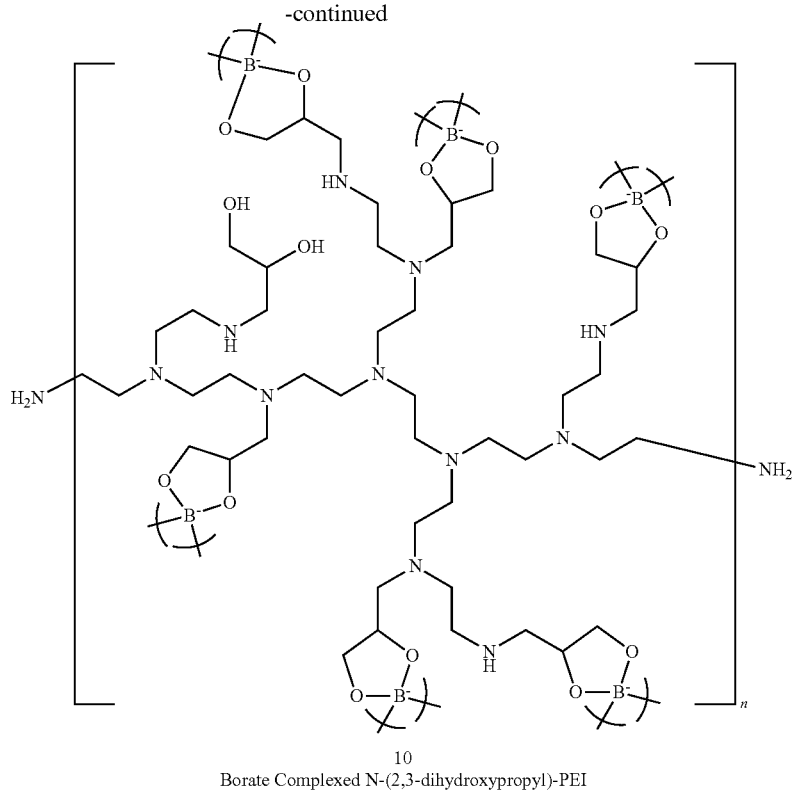

10
Borate Complexed N-(2,3-dihydroxypropyl)-PEI

TABLE 2 recites the weight percentages of compounds 8, 4, and 6, employed in one embodiment to prepare polymeric borate ester 10.

TABLE 2

| Reactant | Reactant CAS Registry Number | Concentration (Wgt. %) |
|---|---|---|
| Polyethyleneimine (BASF Lupasol WF) | 9002-98-6 | 46.75 |
| Glycidol (Dixie Chemical Corp.) | 556-52-5 | 50.4 |
| Boric Acid | 10043-35-3 | 2.85 |

In certain embodiments, the preparation of intermediate polyol 9 and the subsequent preparation of borate ester polymer 0 can be performed in a "one pot" synthesis.

Chemical Abstracts Service has assigned CAS Registry Number 1485099-25-9 borate ester polymer 10.

Example 3

Preparation of Borate Ester Polymer 11

In certain embodiments, Applicant's borate ester is formed by treating a mixture of polyol 5 and polyol 9 with boric acid 6 to form a mixture comprising polymeric borate ester 7, polymeric borate ester 10, and polymeric borate ester 11.

The relative amounts of borate ester 7, polymeric borate ester 10, and polymeric borate ester 11 is a function of the molar ratio of polyol 5 to polyol 9, and the molar ratio of the combined polyols 5 and 9 to boric acid 6.

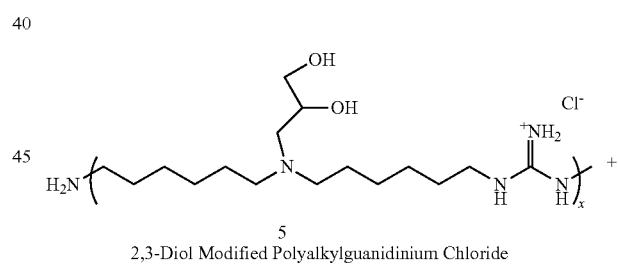

5
2,3-Diol Modified Polyalkylguanidinium Chloride

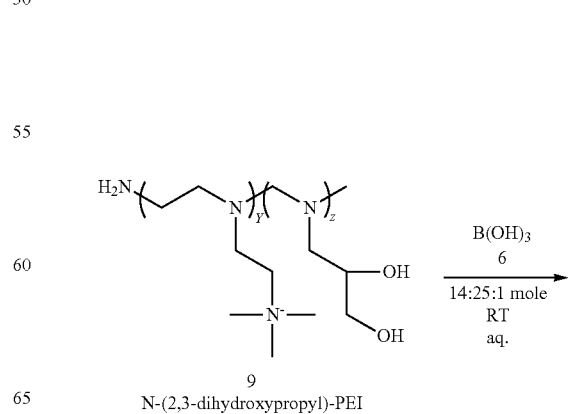

9
N-(2,3-dihydroxypropyl)-PEI

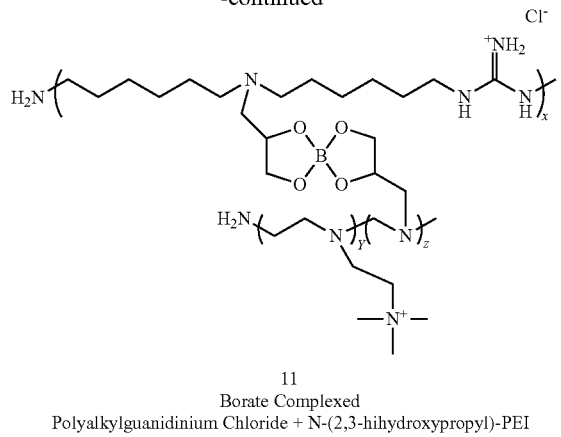

11
Borate Complexed
Polyalkylguanidinium Chloride + N-(2,3-hihydroxypropyl)-PEI

Example 4

Preparation of Borate Ester Polymer 13

In certain embodiments, Applicant prepares a polyol 13 by treating PEI 8 with gluconolactone 12.

Example 5A

Polyol 13 was prepared via ring opening aminolysis reaction between delta-gluconolactone 12 and polyethyleneimine 8 in propylene glycol. The synthesis procedure entailed first dissolving BASF Lupasol WF polyethyleneimine (PEI) within stirred propylene glycol at 65° C. followed by addition of delta-gluconolactone solid (GLA—Junbunzlauer) to the PEI solution accompanied by heating the mixture at 85° C. for 10 minutes. FTIR Spectra were obtained for various PEI and GLA reactant ratios in propylene glycol solvent. A legend for each sample composition analyzed via FTIR is presented below. As a point of comparison, FTIR Spectra was also obtained upon a propylene glycol solution containing 16.6 weight % gluconolactone reactant.

Example 5B

Applicant has found that Gluconamide substituted PEI 13 forms stiff coatings when disposed on fabric. Modifications were made to Applicant's formulation to enhance treated fabric hand and drape.

Applicant discovered that a using a series of substituted, amino-silicones enhance treated garment hand and drape.

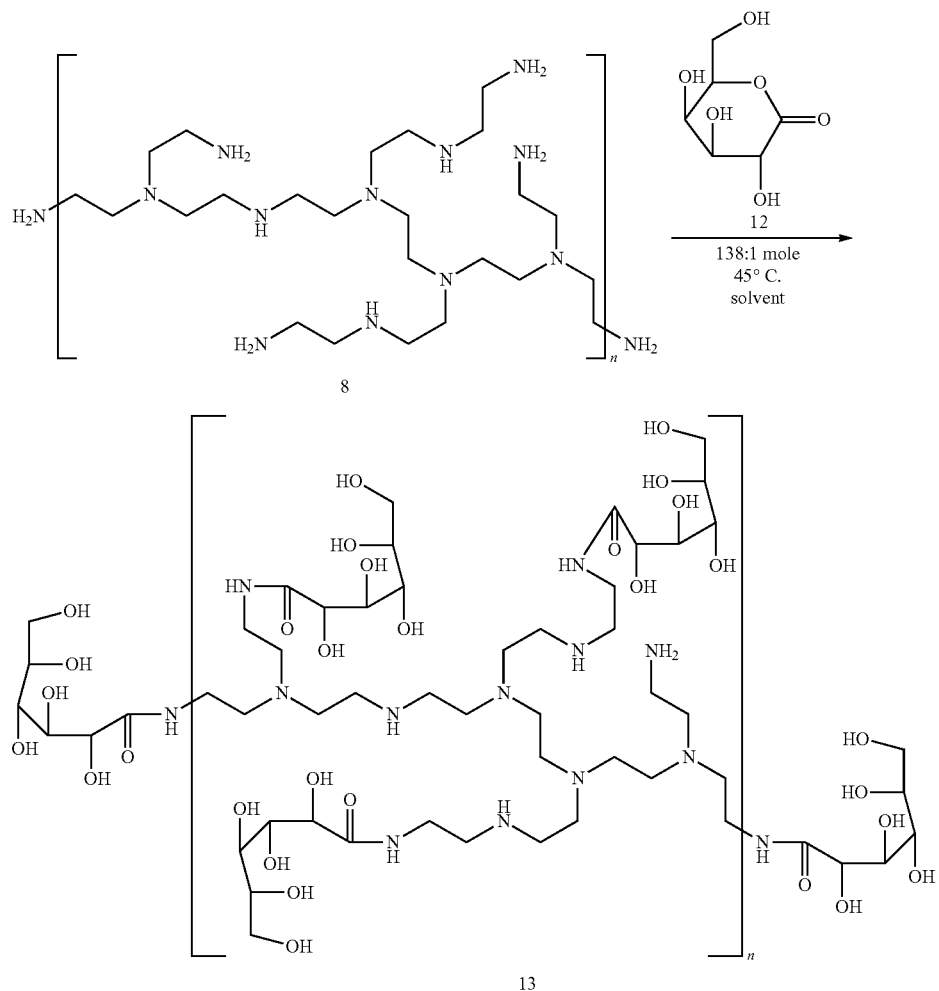

Applicant reacts the primary amine groups within these amine functional silicones 21 with gluconolactone 12 to form substituted polysiloxane 22 comprising pedant hydroxyl groups on both ends, wherein n is between about 50 and about 1000.

In certain embodiments, Applicant first pre-reacts a portion of the primary amine groups on PEI with gluconolactone 12 in propylene glycol solvent thereby forming pendant gluconamide moieties extending outwardly from a portion of the primary amino groups on PEI. In certain embodi-

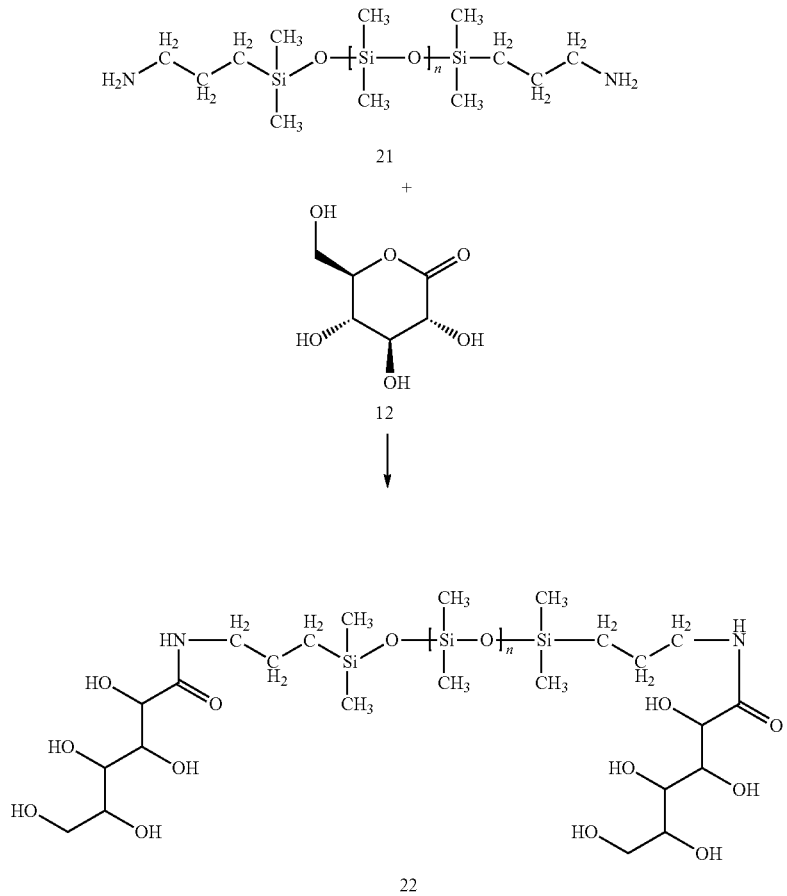

In certain embodiments, the gluconamide ring opening reaction is performed neat. In other embodiments, the gluconamide ring opening reaction is performed in a solvent (e.g. propylene glycol) at temperatures ranging from ambient to 120 Celsius. The resultant gluconamide functionalized silicone 22 is blended with gluconamide substituted PEI 20 in various ratios by weight; preferably ranging from 0.00000001 to 1000 gluconamide substituted silicone to gluconamide substituted PEI ratio.

Borax, boric acid, titanate, silicate and/or zirconate could also be added to these gluconamide substituted silicone—PEI blends to assist in its compatibilization if needed.

Applicant has found an alternative means of enhancing the hand, drape and flexibility of gluconamide substituted PEI 20 textile coatings with addition of small amounts of gluconic acid or its alkaline, alkaline earth. main group or transition metal salt (e.g. sodium gluconate, potassium gluconate, calcium gluconate, aluminum gluconate, zinc gluconate or mixtures thereof) to gluconamide substituted PEI 20 in various amounts; preferably ranging from 0.000000001 to 1000 gluconate to gluconamide substituted PEI polymer ratio by weight. In certain embodiments, the gluconate will co-crystallize and self assembly with the gluconamide groups on PEI.

ments, the remaining primary amines are then neutralized with equimolar equivalents of gluconic acid. The resultant amine gluconate salts co-crystallize with pendant gluconamides on PEI.

Example 5C

In certain embodiments, Applicant forms a polymeric polyol, wherein a plurality of pendent hydroxyl groups are available to form borate ester complexes between polymer chains as described hereinabove. In certain embodiments, Applicant reacts substituted silicon polymer 23 with gluconolactone 12 to form substituted polysiloxane 25. In certain embodiments, x is between about 50 and about 1000, y is between about 50 and about 1000, and z is between about 50 and about 1000.

In certain embodiments, Applicant reacts substituted polysiloxane 25 with a boron material such as and without limitation boric acid, as described herein. In other embodiments, Applicant treats a mixture of polysiloxane 24 and one or more of polysiloxanes 9, 11, 13, 20, and/or 22, with a boron material to form asymmetrical borate ester complexes.

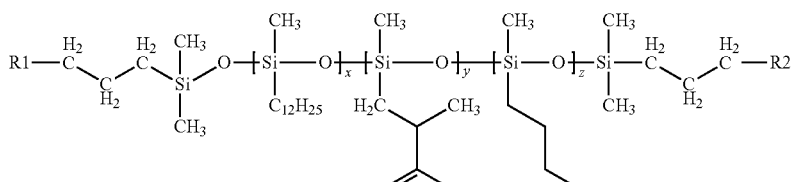
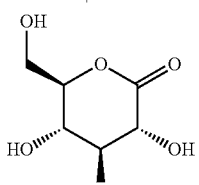

23

+

12

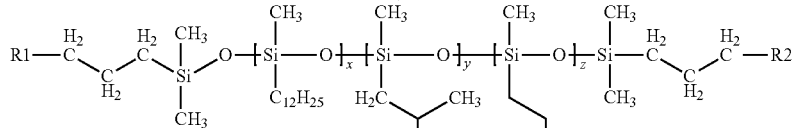
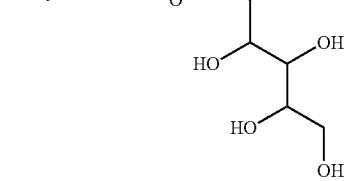

24

Example 5D

In certain embodiments, Applicant forms a polymeric polyol, wherein a plurality of pendent hydroxyl groups are available to form borate ester complexes between polymer chains as described hereinabove. In certain embodiments, Applicant reacts substituted silicon polymer 25 with gluconolactone 12 to form substituted polysiloxane 26. In certain embodiments, a is between about 50 and about 1000. In certain embodiments, b is between about 50 and about 1000.

In certain embodiments, Applicant reacts substituted polysiloxane 26 with a boron material such as and without limitation boric acid, as described herein. In other embodiments, Applicant treats a mixture of polysiloxane 26 and one or more of polysiloxane 9, 11, 13, 20, 22, and/or 24, with a boron material to form asymmetrical borate ester complexes.

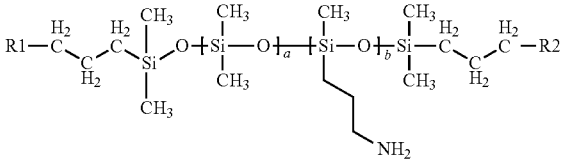

25

+

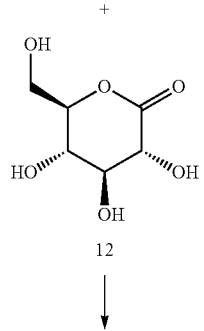

12

-continued

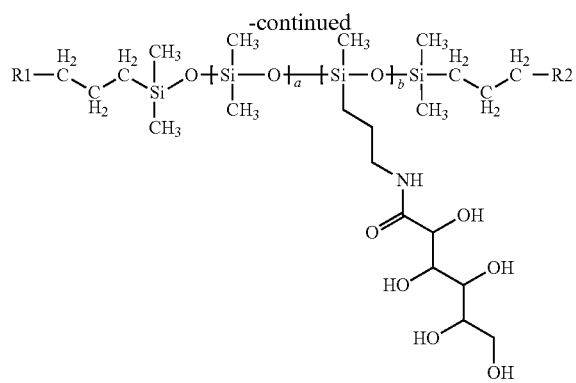

26

Example 6

About 0.56 g of Glucono delta lactone (Jungbunzlauer) were dissolved by heating at 98° C. in 2.56 g industrial grade propylene glycol yielding a clear colorless solution henceforth denoted as Solution "A".

A separate clear, colorless solution (Solution "B") composed on 0.51 g branched polyethyleneimine (BASF Lupasol WF PEI) was subsequently prepared via dissolution at 65° C. in 0.74 g of propylene glycol.

The contents of Solution A was then mixed at 65° C. with Solution B accompanied by stirring for 10 minutes. This yielded a clear solution mixture containing gluconamide substituted polyethyleneimine product solute.

Table 3 summarizes the formulations used in preparing three (3) embodiment of

TABLE 3

| Sample # 5-22-14-01 | Sample # 5-22-14-02 | Sample # 5-22-14-03 |
| --- | --- | --- |
| 0.80 mol GLA/mol PEI Primary Amine | 0.327 mol GLA/mol PEI Primary Amine | 0.123 mol GLA/mol PEI Primary Amine |
| 0.74 g PEI | 0.75 g PEI | 1.18 g PEI |
| 0.61 g GLA | 0.25 g GLA | 0.15 g GLA |
| 3.06 g Propylene Glycol | 3.05 g Propylene Glycol | 3.02 g Propylene Glycol |
| 30.6 Wgt % Gluconamide sub PEI Solute | 24.7 Wgt. % Gluconamide sub PEI Solute | 30.6 Wgt. % Gluconamide Substituted PEI |

Referring now to FIG. 1, gluconamide formation was verified by FTIR noting the disappearance of the 1739 wavenumber carbonyl stretch 110 associated with gluconolactone reactant and an appearance of the amide FTIR stretch 120 at 1647-51 wavenumbers for the gluconamide substituted PEI product.

Reaction of polyol 13 with boric acid 6 yielded borate ester polymer 14. As described hereinabove, in certain embodiments other boron oxides can be utilized in place of boric acid.

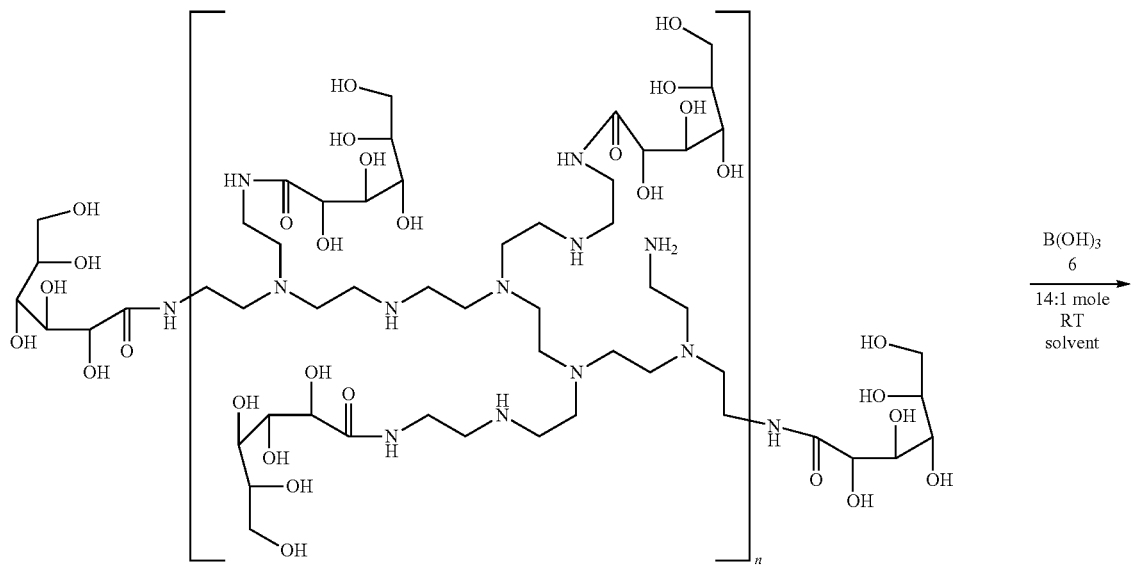

13

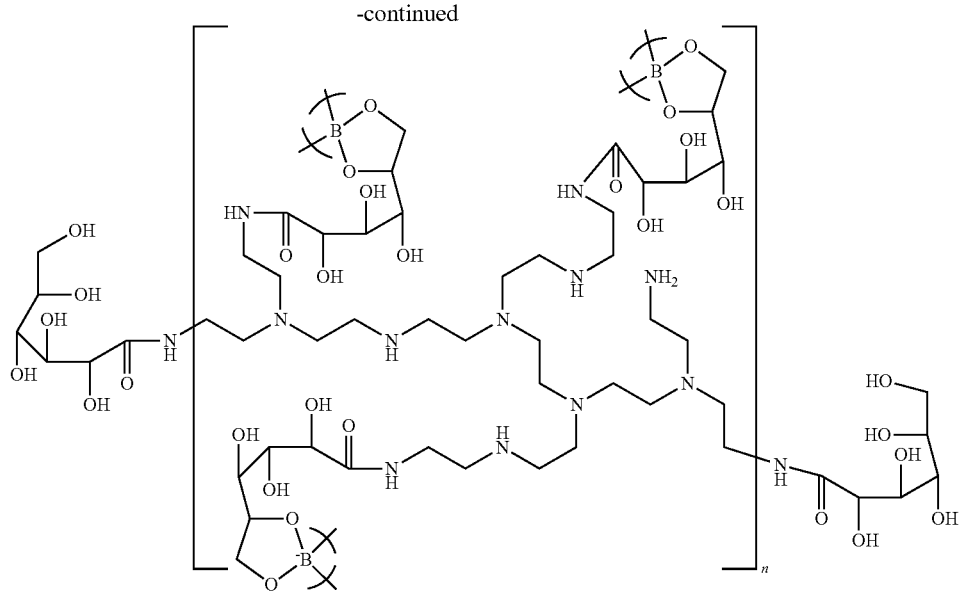
14
Example 7
Preparation of Borate Ester Polymer 17
Polyol 16 was prepared via ring opening aminolysis reaction between Lactobionic Acid 15 and polyethyleneimine 8.
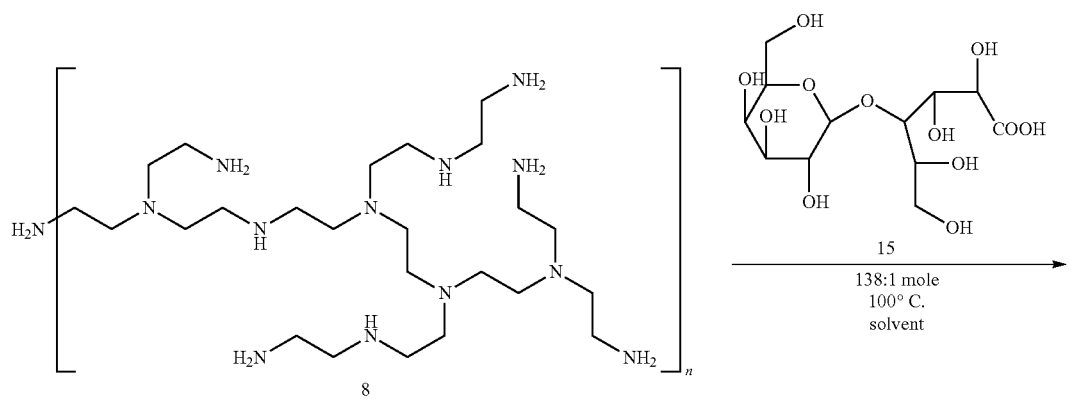

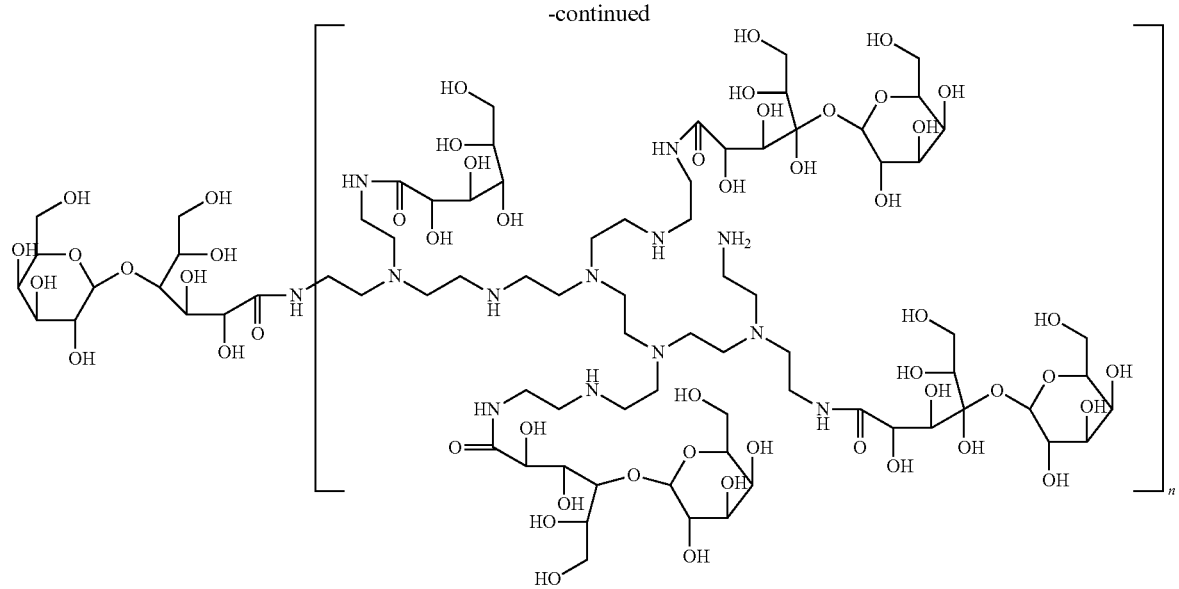
16
Reaction of polyol 16 with boric acid 6 yielded borate ester polymer 17. As described hereinabove, in certain embodiments other boron oxides can be utilized in place of boric acid.
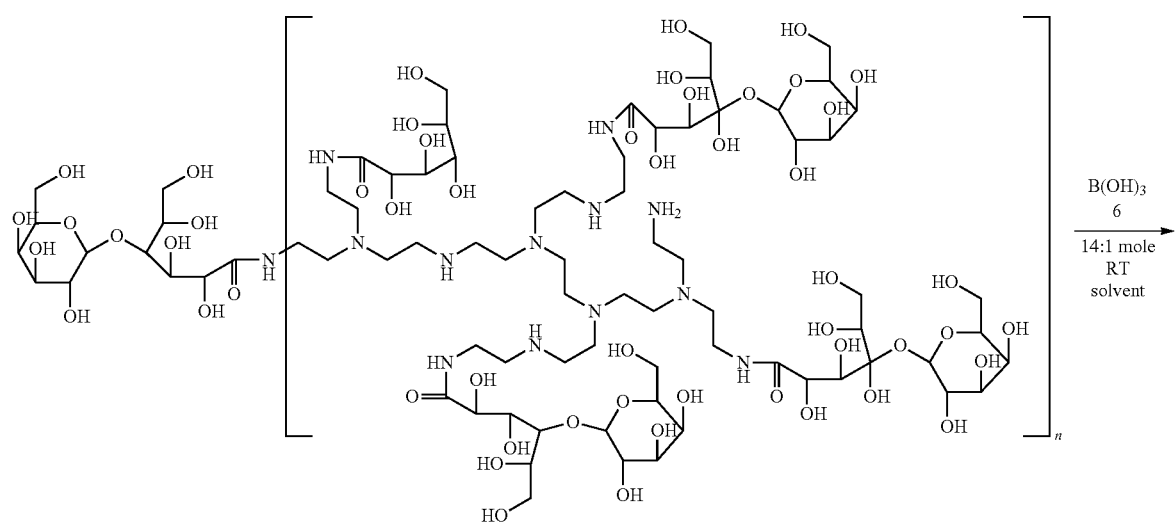
16

-continued
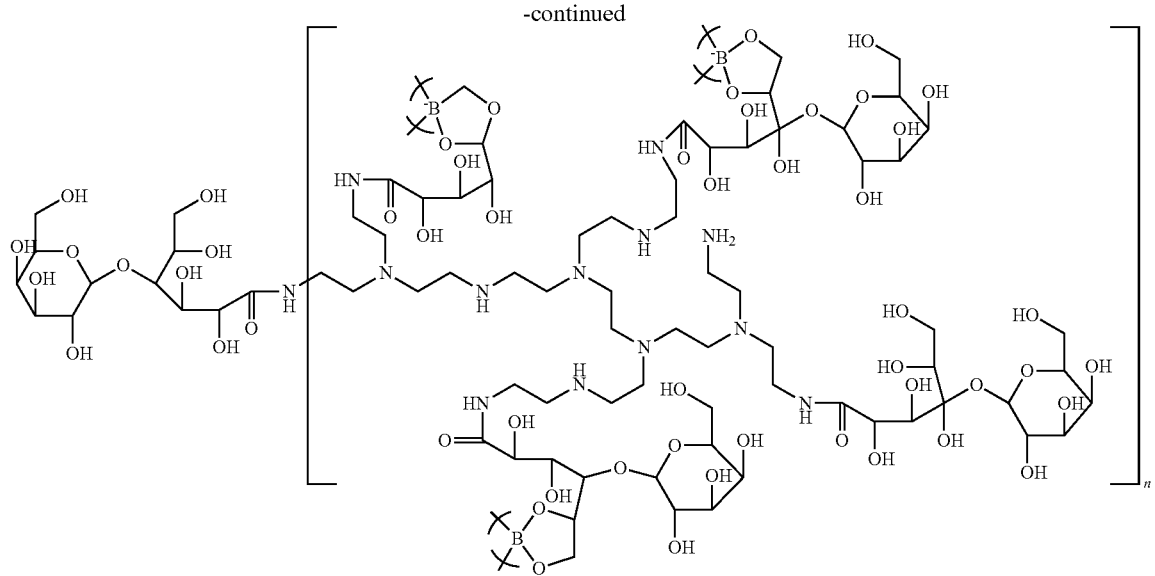
17
Example 8
Preparation of Borate Ester Polymer 20
Polyol 19 was prepared via ring opening aminolysis reaction between Glycerin Carbonate 18 and polyethyleneimine 8.
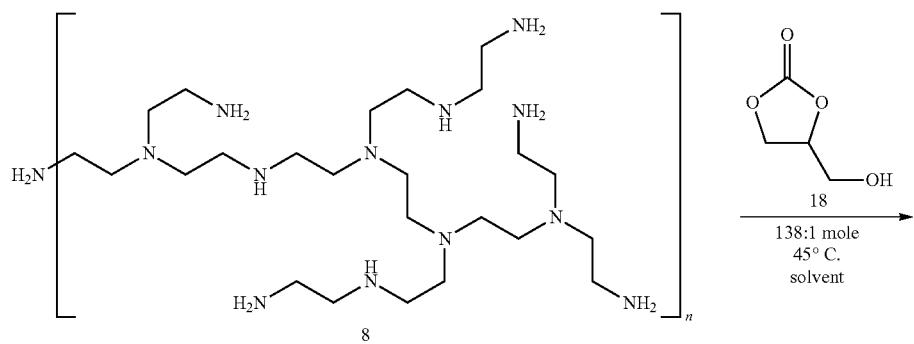

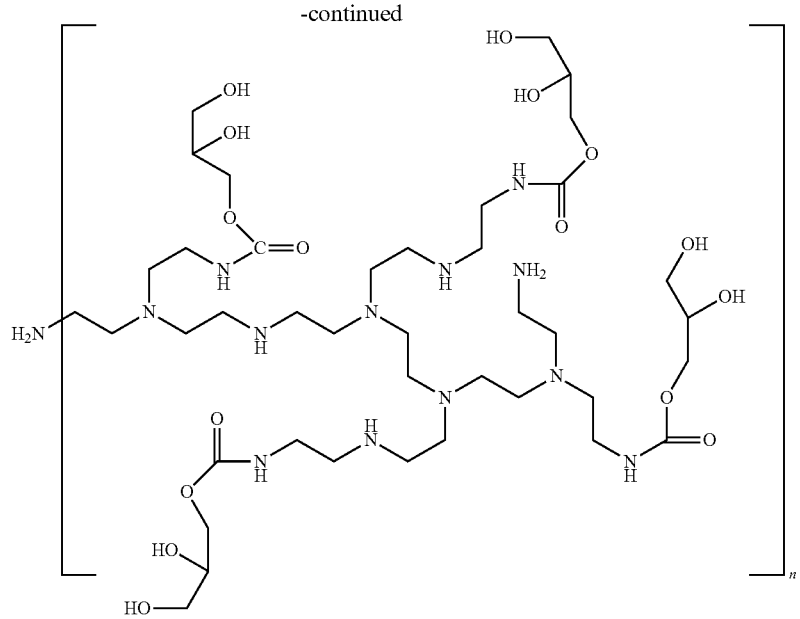
19
Reaction of polyol 19 with boric acid 6 yielded borate ester polymer 20. As described hereinabove, in certain embodiments other boron oxides can be utilized in place of boric acid.
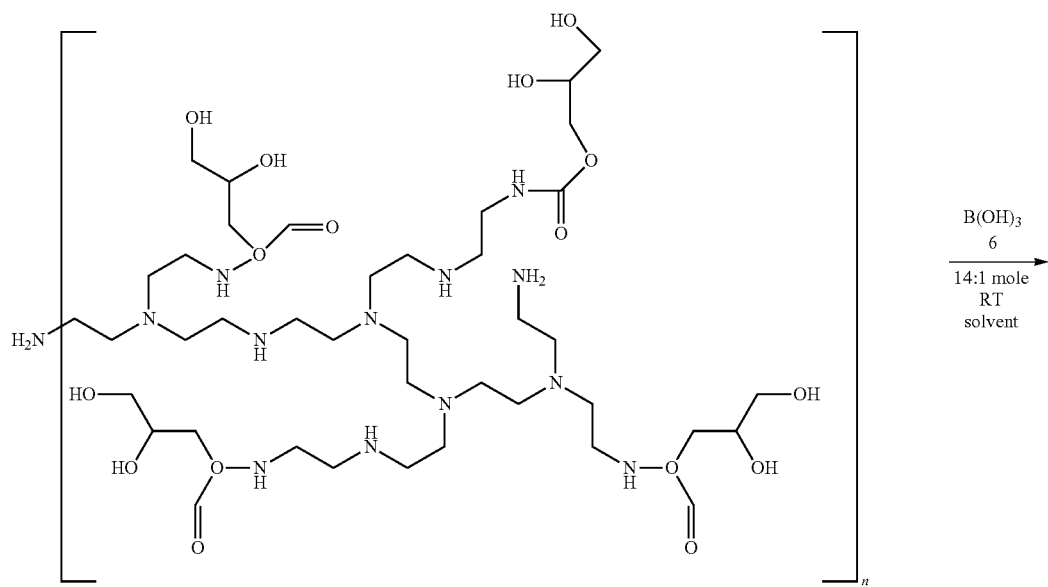
19

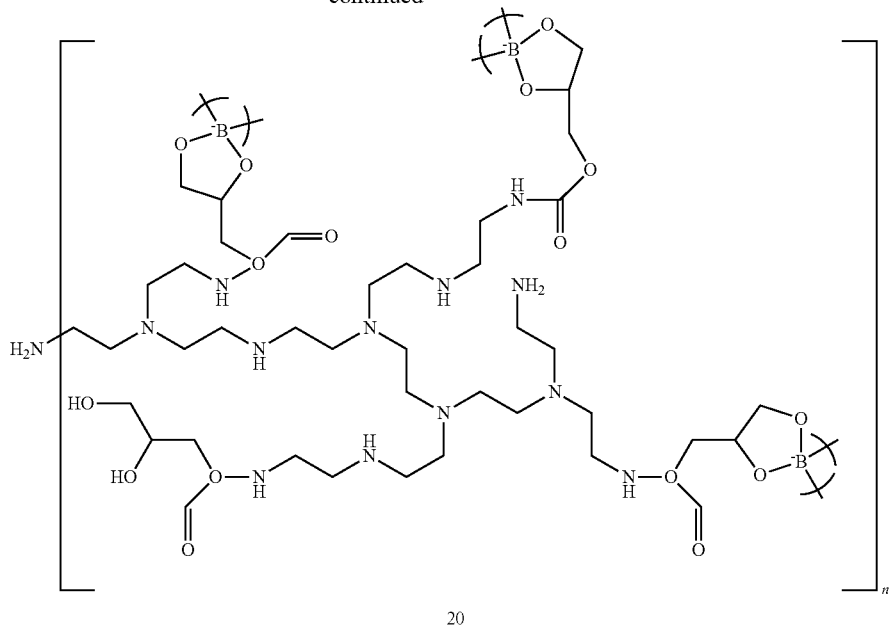

20

In Examples 1, 2, 3, 6, 7, and 8, polyols 5, 9, 5/9, 13, 16, and 19, respectively, are reacted with a boron oxide material to form crosslinked polymers 7, 10, 11, 14, 17, and 20, respectively. In other embodiments, polyols 5, 9, 5/9, 13, 16, and/or 19, are reacted with other cross-linking agents to formed crosslinked polymers. In certain embodiments, such cross-linking agents are, without limitation, ethylene dichloride ether, diepoxides, polyepoxides, chlorohydrin, chlorotriazines, glucoonates, phosphates, and the like.

During physical activity, the human body produces sweat and other proteins that can become embedded in the fabric fibers used to form clothing being worn. Certain bacteria and enzymes feed on the proteins and produce gas (odor) as waste.

Applicant has discovered that fabrics treated with coating comprising polymeric borate ester 7, and/or polymeric borate ester 10, and/or polymeric borate ester 11, and/or polymeric borate ester 14, and/or polymeric borate ester 17, and/or polymeric borate ester 20, inhibit certain enzymes from producing odor, and thereby, those treated fabrics control odors in such treated garments.

In certain embodiments, polymeric borate ester 7, and/or polymeric borate ester 10, and/or polymeric borate ester 11, and/or polymeric borate ester 14, and/or polymeric borate ester 17, and/or polymeric borate ester 20, can be applied to a fabric using conventional fabric coating apparatus and methods.

In certain embodiments, a mixture of water and polymeric borate ester 7, and/or polymeric borate ester 10, and/or polymeric borate ester 11, and/or polymeric borate ester 14, and/or polymeric borate ester 17, and/or polymeric borate ester 20, is prepared. In certain embodiments, one or more polymeric borate esters are present in such an aqueous mixture at a weight percentage of between about 0.1 weight percent and about 10 weight percent. The aqueous mixture can be disposed in a conventional spray bottle. The one or more polymeric borate esters can be sprayed on a fabric via the spray bottle.

As those of skill in the art will appreciate, garments coated with polymeric borate ester 7, and/or polymeric borate ester 10, and/or polymeric borate ester 11, and/or polymeric borate ester 14, and/or polymeric borate ester 17, and/or polymeric borate ester 20, will from time to time need washing. Applicant has developed a detergent for use when washing fabrics coated with polymeric borate ester 7, and/or polymeric borate ester 10, and/or polymeric borate ester 11, and/or polymeric borate ester 14, and/or polymeric borate ester 17, and/or polymeric borate ester 20.

Example 9

Detergent for Fabric Treated with Polymeric Borate Ester 7, and/or Polymeric Borate Ester 10, and/or Polymeric Borate Ester 11, and/or Polymeric Borate Ester 14, and/or Polymeric Borate Ester 17, and/or Polymeric Borate Ester 20

About 8.01 g of a 59.7 weight percent aqueous solution of triethanolamine orthophosphate (e.g. triethanolamine reacted with orthophosphoric acid in 2:1 molar amine:orthophosphoric acid stoichiometry was first prepared. Then 0.42 g of Sasol Novel 23E9 fatty ethoxylated alcohol surfactant solution was added dropwise accompanied by rapid stirring at room temperature to the aqueous triethanolamine phosphate solution. Finally, 10.56 g of an aqueous solution containing 20 weight percent of Potassium Tripolyphosphate (KTPP-INNOPHOS) solute was then added to the above accompanied by rapid stirring. A transparent, slightly yellow aqueous detergent solution is produced. This detergent solution is compatible and suitable for cleaning fabrics which have been pre-treated with the aforementioned borate ester-based odor control coating.

While the preferred embodiments of the present invention have been illustrated in detail, it should be apparent that modifications and adaptations to those embodiments may occur to one skilled in the art without departing from the scope of the present invention.

I claim:

1. A method to prepare a borate complexed polyethyleneimine polymer, comprising:

reacting glycidol with polyethyleneimine to prepare a substituted polyethyleneimine polyol;

reacting said substituted polyethyleneimine polyol with a boron-oxide material to prepare said borate complexed polyethyleneimine polymer.

2. The method of claim 1, wherein glycidol is added to said polyethyleneimine at a 1:1 molar ratio.

3. The method of claim 1, wherein glycidol is added to said polyethyleneimine at about a 14:1 molar ratio of glycidol to polyethyleneimine.

4. The method of claim 1, wherein said boron-oxide material comprises orthoboric acid.

5. The method of claim 1, wherein said boron-oxide material comprises borax.

6. A method to prepare a borate complexed polyethyleneimine polymer, comprising:

reacting gluconolactone with polyethyleneimine to prepare a substituted polyethyleneimine polyol;

reacting said substituted polyethyleneimine polyol with a boron-oxide material to prepare said borate complexed polyethyleneimine polymer.

7. The method of claim 6, wherein gluconolactone is added to said polyethyleneimine at a 0.80 molar ratio.

8. The method of claim 6, wherein gluconolactone is added to said polyethyleneimine at a 0.327 molar ratio.

9. The method of claim 6, wherein gluconolactone is added to said polyethyleneimine at a 0.123 molar ratio.

10. The method of claim 6, wherein said boron-oxide material comprises orthoboric acid.

11. The method of claim 6, wherein said boron-oxide material comprises borax.

12. A method to prepare a borate complexed polyethyleneimine polymer, comprising:

reacting lactobionic acid with polyethyleneimine to prepare a substituted polyethyleneimine polyol;

reacting said substituted polyethyleneimine polyol with a boron-oxide material to prepare said borate complexed polyethyleneimine polymer.

13. The method of claim 12, wherein lactobionic acid is added to said polyethyleneimine at a 1:1 molar ratio.

14. The method of claim 12, wherein lactobionic acid is added to said polyethyleneimine at about a 14:1 molar ratio of lactobionic acid to polyethyleneimine.

15. The method of claim 12, wherein said boron-oxide material comprises orthoboric acid.

16. The method of claim 12, wherein said boron-oxide material comprises borax.

* * * * *